(12) United States Patent
Bramley et al.

(10) Patent No.: US 8,178,151 B2
(45) Date of Patent: *May 15, 2012

(54) FROZEN AERATED CONFECTION

(75) Inventors: Allan Sidney Bramley, Shambrook (GB); Sabina Silvia Haenel Burmester, Shambrook (GB); Andrew Baxter Russell, Shambrook (GB)

(73) Assignee: Conopco, Inc., Englewood Cliffs, NJ (US)

( * ) Notice: Subject to any disclaimer, the term of this patent is extended or adjusted under 35 U.S.C. 154(b) by 677 days.

This patent is subject to a terminal disclaimer.

(21) Appl. No.: 11/639,851

(22) Filed: Dec. 15, 2006

(65) Prior Publication Data

US 2007/0141206 A1 Jun. 21, 2007

(30) Foreign Application Priority Data

Dec. 21, 2005 (EP) .................................... 05257901

(51) Int. Cl.
*A23G 9/00* (2006.01)
(52) U.S. Cl. ....................................... 426/660; 426/565
(58) Field of Classification Search .................. 426/565, 426/572, 660, 656, 657
See application file for complete search history.

(56) References Cited

U.S. PATENT DOCUMENTS

| | | | |
|---|---|---|---|
| 4,627,983 A | 12/1986 | Scharf et al. | |
| 4,874,627 A | 10/1989 | Greig et al. | |
| 5,084,295 A * | 1/1992 | Whelan et al. | 426/565 |
| 5,215,777 A | 6/1993 | Asher et al. | |
| 5,336,514 A | 8/1994 | Jones et al. | |
| 5,620,732 A | 4/1997 | Clemmings et al. | |
| 6,096,867 A | 8/2000 | Byass et al. | |
| 6,187,365 B1 | 2/2001 | Vaghela et al. | |
| 6,579,557 B1 | 6/2003 | Benjamins et al. | |
| 6,914,043 B1 | 7/2005 | Chapman et al. | |
| 2001/0048962 A1 * | 12/2001 | Anthony Fenn et al. | 426/565 |
| 2002/0197375 A1 | 12/2002 | Adolphi et al. | |
| 2003/0148400 A1 | 8/2003 | Haikara et al. | |
| 2003/0166960 A1 | 9/2003 | deVocht et al. | |
| 2003/0175407 A1 | 9/2003 | Kunst et al. | |
| 2004/0185162 A1 * | 9/2004 | Finnigan et al. | 426/615 |
| 2005/0037110 A1 * | 2/2005 | Windhab et al. | 426/100 |
| 2005/0123666 A1 | 6/2005 | Vaghela et al. | |
| 2005/0129810 A1 | 6/2005 | Lindner et al. | |
| 2006/0024417 A1 | 2/2006 | Berry et al. | |
| 2006/0024419 A1 * | 2/2006 | Aldred et al. | 426/565 |
| 2007/0014908 A1 | 1/2007 | Bramley et al. | |
| 2007/0286936 A1 | 12/2007 | Bramley et al. | |

FOREIGN PATENT DOCUMENTS

| | | | |
|---|---|---|---|
| CA | 271999 | * | 2/1981 |
| CA | 1218557 | | 11/2004 |
| DE | 29715519 | | 1/1998 |
| EP | 0426211 | | 5/1991 |
| EP | 0777969 | | 6/1997 |
| EP | 0783254 B1 | | 8/2001 |

(Continued)

OTHER PUBLICATIONS

Arbuckle, Ice Cream 2nd Edition, The AVI Publishing Company 1972, pp. 35, 265, and 266.*

(Continued)

*Primary Examiner* — Kelly Bekker
(74) *Attorney, Agent, or Firm* — Alan A. Bornstein

(57) ABSTRACT

A frozen aerated confection comprising an ice structuring protein (ISP) and a hydrophobin is provided.

11 Claims, 4 Drawing Sheets

FOREIGN PATENT DOCUMENTS

| | | |
|---|---|---|
| EP | 0783254 B1 | 8/2001 |
| EP | 1327390 | 7/2003 |
| EP | 1417892 A1 | 5/2004 |
| EP | 1520484 | 4/2005 |
| EP | 1541034 A1 | 6/2005 |
| EP | 1623631 B1 | 4/2007 |
| GB | 1556297 | 11/1979 |
| JP | 50-5596 | 1/1975 |
| WO | WO 90/13571 | 11/1990 |
| WO | WO 92/22581 | 12/1992 |
| WO | WO 94/03617 | 2/1994 |
| WO | WO 96/11586 | 4/1996 |
| WO | WO 96/39878 | 12/1996 |
| WO | WO 96/41882 | 12/1996 |
| WO | WO 98/04148 | 2/1998 |
| WO | WO 98/04699 | 5/1998 |
| WO | WO 99/37673 | 7/1999 |
| WO | WO 99/54725 | 10/1999 |
| WO | WO 00/53026 | 9/2000 |
| WO | WO 00/53027 | 9/2000 |
| WO | WO 00/53029 | 9/2000 |
| WO | WO 00/58342 | 10/2000 |
| WO | WO 01/14521 | 3/2001 |
| WO | WO 01/57076 A1 | 8/2001 |
| WO | WO 01/74864 A1 | 10/2001 |
| WO | WO 01/83534 A1 | 11/2001 |
| WO | WO 03/015530 | 2/2003 |
| WO | WO 03/053383 | 7/2003 |
| WO | WO 2005/058058 A1 | 6/2005 |
| WO | WO 2006/010425 | 2/2006 |
| WO | WO 2006/010426 | 2/2006 |

OTHER PUBLICATIONS

Hakanpaa et al, Atomic Resolution Structure of the HFPII Hydrophobin, a Self-assembling Amphiphile, JBC Papers Oct. 10, 2003, pp. 534-539.*
Van der Werf, Green coatings, healthy foods, and drug targeting, Leads in Lfie Science 2000.*
Arbuckle, Ice Cream 2nd Edition AVI Publishing 1972, pp. 284 and 285.*
Fellows, P. Food Processing Technology, Principles and Practice 2nd Edition, Woodhead Publishing 2000, pp. 83, 140, and 429.*
Arbuckle, Ice Cream 2nd Edition AVI Publishing 1972, p. 31.*
Penttila et al., "Molecular Biology of *Trichoderma* and Biotechnological Applications", Handbook of Fungal Biotechnology, 2$^{nd}$ Ed., vol. 20, 2004, pp. 413-427.
Fennema's Food Chemistry, 4$^{th}$ Edition, CRC Press, 2008, pp. 727 and 728.
Dictionary.com, Stabilizer, pp. 1-5, print date Jun. 14, 2010.
Guargum.biz, Guar Gum, pp. 1-2, print date Jun. 14, 2010.
Office Action dated Jun. 25, 2010 for Aldred et al., U.S. Appl. No. 11/168,214, pp. 1-23.
Office Action dated Jun. 17, 2010 for Berry et al., U.S. Appl. No. 11/168,209, pp. 1-21.
Co-pending application Cox et al., U.S. Appl. No. 13/378,143, filed Dec. 14, 2011, pp. 1-15.
Co-pending application Hedges et al., U.S. Appl. No. 12/636,157, filed Apr. 12, 2010, pp. 1-11.
Co-pending application Cox et al., U.S. Appl. No. 12/682,717, filed Dec. 11, 2009, pp. 1-27.
International Search Report International application No. PCT/EP2006/011735 mailed Mar. 15, 2007, pp. 1-3.
European Search Report application No. EP 05257901 dated May 19, 2006, pp. 1-3.
Russo et al., "The surface activity of the phytotoxin cerato-ulmin", 1982 National Research Council of Canada.
Wessels, Fungal hydrophobins: proteins that function at an interface, Jan. 1996, Elsevier Science Ltd., vol. 1, pp. 9-15.
van der Werf, "Surface Active Proteins", Leads in Life Science, 7/00:5, p. 1.
Stringer et al., "Cerato-ulmin, a Toxin Involved in Dutch Elm Disease, is a Fungal Hydrophobin", The Plant Cell, Feb. 1993, pp. 145-146.
Database WPI, Sectiion Ch, Week 200444, Derwent Publications Ltd., London, GB, AN 2004-465457, XP002313777 7 KR 2004 018 844 A (Kim), Apr. 2004, p. 1.
Woesten, "Hydrophobins, the fungal coat unravelled", Biochimica et Biophysica Scta. MR. Reviews on Biomembranes, Elsevier, Amsterdam, NL, vol. 1469, No. 2, Sep. 2000, pp. 79-86.
De Vries et al., "Identification and characterization of a tri-partite hydrophobin from *Claviceps fusiformis*", 1999, Eur. J. Biochem 262: pp. 377-385.
Talbot, 2001, fungal Hydrophobins in "The Mycota: A comprehensive Treatise on fungi as experimental systems for basic and applied research", Howard and Gow (Eds), vol. 7: "Biology of the fungal cell", Springer-Verlag, Berline and Heidelberg GmbH and Co., pp. 145-159.
Wessels, "Hydrophobins: Proteins that Change the Nature of the Fungal Surface", Advances in Microbial Physiology, Academic Press Ltd., London, GB, vol. 38, No. 38, 1997, pp. 1-45, XP000999791.
Scholtmeijer et al., "Fungal hydrophobins in medical and technical applications", Applied Microbiology and Biotechnology, Springer Verlag, Berlin, Germany, vol. 56, No. ½, Jul. 2001, pp. 1-8, XP001120015.
Wosten, "Hydrophobins: Multipurpose Proteins", 2001, Annu. Rev. Microbiol. 55: pp. 625-646.
Askolin et al., "Overproduction, purification, and characterization of the *Trichoderma reesei* hydrophobin HFBI", 2001, Appl. Microbiol. Biotechnol. 57:, pp. 124-130.
Calonje, "Properties of a hydrophobin isolated from the mycoparasitic fungus *Verticillium fungicola*", Can. J. Microbiol. 48: 1030-1034 (2002).
Linder et al., Hydrophobins: the protein-amphiphiles of filamentous fungi, 2005, Elsevier B.V. on behalf of the Federation of European Microbiological Societies, pp. 1-20.
De Vocht et al., "Structural Characterization of the Hydrophobin SC3, as a Monomer and after Self-Assembly at Hydrophobic/Hydrophillic Interfaces", Biophysical Journal, 74: 4/98, pp. 2059-2068.
Collen et al., A novel two-step extraction method with detergent/polymer systems for primary recovery of the fusion protein endoglucanase I-hydrophobin I, 2002, Biochim. Biophys. Acta., 1569: pp. 139-150.
Kershaw et al., Hydrophobins and Repellents: Proteins with Fundamental Roles in Fungal Morphogenesis, Fungal Genetics and Biology, 23: pp. 18-33 (1998).
Teodora Gilga, article available on the Internet at least of May 20, 2007 regarding hydrophobins, with translation, pp. 1-22.
Office Action dated Oct. 19, 2009 for Aldred et al., U.S. Appl. No. 11/168,214, filed Jun. 27, 2005, pp. 1-53.
Co-pending application Aldred et al., U.S. Appl. No. 11/168,214, filed Jun. 27, 2005, pp. 1-27.
Publication No. JP 61-293348, Dec. 1986—Patent Abstracts of Japan, p. 1.
Publication No. JP 53006491, Jan. 1978—Patent Abstracts of Japan, p. 1.
Publication No. JP 03164156, Jul. 1991—Patent Abstracts of Japan, p. 1.
Co-pending application Berry et al., U.S. Appl. No. 11/168,209, filed Jun. 27, 2005; pp. 1-36.
Co-pending application Burmester et al., U.S. Appl. No. 12/002,684, filed Dec. 18, 2007, pp. 1-35.
Co-pending application Aldred et al., U.S. Appl. No. 11/525,060, filed Sep. 21, 2006, pp. 1-33.
Co-pending application Cox et al., U.S. Appl. No. 11/699,601, filed Jan. 30, 2007, pp. 1-28.
Co-pending application Cox, U.S. Appl. No. 11/699,602, filed Jan. 30, 2007, pp. 1-26.
Co-pending application Cox et al., U.S. Appl. No. 11/524,675, filed Sep. 21, 2006, pp. 1-19.
Co-pending application Aldred et al., U.S. Appl. No. 11/524,977, filed Sep. 26, 2006, pp. 1-39.
Co-pending application Aldred et al., U.S. Appl. No. 12/287,957, filed Oct. 15, 2008, pp. 1-28.
Co-pending application Cox et al., U.S. Appl. No. 12/578,752, filed Oct. 14, 2009, pp. 1-14.

Co-pending application Aumaitre et al., U.S. Appl. No. 12/409,549, filed Mar. 24, 2009, pp. 1-19.
Co-pending application Cox et al., U.S. Appl. No. 12/532,667, filed Sep. 23, 2009, pp. 1-18.
Co-pending application Cox et al., U.S. Appl. No. 12/532,670, filed Sep. 23, 2009, pp. 1-23.
Co-pending application Aldred et al., U.S. Appl. No. 12/788,395, filed May 27, 2010, pp. 1-14.
Co-pending application Watts et al., U.S. Appl. No. 12/788,419, filed May 27, 2010, pp. 1-15.
Co-pending application Cox et al., U.S. Appl. No. 12/780,294, filed May 14, 2010, pp. 1-16.
Co-pending application Cox et al., U.S. Appl. No. 12/780,323, filed May 14, 2010, pp. 1-15.
Communication of Notices of Opposition dated Dec. 29, 2009 to European Patent No. EP 1926399, p. 1.
Cover sheet for Handbook of Fungal Biotechnology, $2^{nd}$ Ed., Revised and Expanded, vol. 20, p. 1.
Grounds of Opposition—Nestec S.A./Unilever N.V. (EP 1926399), 13 pages, Nov. 2009.
PCT International Preliminary Report on Patentability International Application No. PCT/EP2006/008993 dated Dec. 17, 2007, p. 1-4.
Communication pursuant to Article 94(3) EPC, Application No. 06 805 732.2-1221 dated Jul. 1, 2008, pp. 1-3.
Annex International Preliminary Report on Patentability, International Application No. PCT/EP2006/0089939, pp. 1-3.
Wosten et al., "Interfacial self-assembly of a hydrophobin into an emphipathic protein membrane mediates fungal attachment to hydrophobic surfaces", The EMBO Journal, vol. 13, No. 24, pp. 5848-5854, 1994.
Dr. E. Kolodziejcxzyk, "Adsorption of different proteins to Teflon sheets: Experimental results", Nestle Research Center, Nov. 16, 2009, pp. 1-10.
Damodaran, "Adsorbed layers formed from mixtures of proteins", Current Opinion in Colloid and Interface Science, 9 (2004) 328-339.
Bailey et al., "Process technological effects of deletion and amplification of hydrophobins 1 and II in transformants of *Trichoderma reesei*", Appl. Microbiol. Biotechnol. (2002) 58:721-727.
Grant & Hackh's Chemical Dictionary, Fifth Ed., McGraw-Hill Book Company, 1987, p. 212.
Office Action for Berry et al., U.S. Appl. No. 11/168,209 dated Sep. 8, 2006, pp. 1-12.
Office Action for Berry et al., U.S. Appl. No. 11/168,209 dated Apr. 6, 2007 pp. 1-6.
Office Action for Berry et al., U.S. Appl. No. 11/168,209 dated Jan. 18, 2008, pp. 1-8.
Amendment for Berry et al., U.S. Appl. No. 11/168,209 dated Jul. 18, 2008, pp. 1-7.
Interview Summary for Berry et al., U.S. Appl. No. 11/168,209 dated Jul. 15, 2008, pp. 1-2.
Office Action for Berry et al., U.S. Appl. No. 11/168,209 dated Mar. 10, 2009, pp. 1-17.
Office Action for Berry et al., U.S. Appl. No. 11/168,209 dated Dec. 18, 2009, pp. 1-15.
Interview Summary for Berry et al., U.S. Appl. No. 11/168,209 dated Jan. 26, 2010, pp. 1-2.
Supplemental Amendment for Aldred et al., U.S. Appl. No. 11/168,214 dated Jan. 14, 2009, pp. 1-15.
Amendment for Aldred et al., U.S. Appl. No. 11/168,214 dated Jan. 14, 2009, pp. 1-15.
Office Action for Aldred et al., U.S. Appl. No. 11/168,214 dated Jan. 4, 2006, pp. 1-8.
Office Action for Aldred et al., U.S. Appl. No. 11/168,214 dated Aug. 8, 2006, pp. 1-7.
Office Action for Aldred et al., U.S. Appl. No. 11/168,214 dated Feb. 6, 2007, pp. 1-9.
Office Action for Aldred et al., U.S. Appl. No. 11/168,214 dated Sep. 25, 2007, pp. 1-8.
Office Action for Aldred et al., U.S. Appl. No. 11/168,214 dated Jul. 14, 2008, pp. 1-9.
Interview Summary for Aldred et al., U.S. Appl. No. 11/168,214 dated Jul. 15, 2008, pp. 1-2.
Office Action for Aldred et al., U.S. Appl. No. 11/168,214 dated Mar. 16, 2009, pp. 1-17.
Office Action for Aldred et al., U.S. Appl. No. 11/168,214 dated Oct. 19, 2009, pp. 1-55.
Interview Summary for Aldred et al., U.S. Appl. No. 11/524,977 dated Jul. 1, 2009, pp. 1-2.
Supplement Amendment for Aldred et al., U.S. Appl. No. 11/524,977 dated Aug. 26, 2009, pp. 1-4.
Supplemental Amendment for Aldred et al., U.S. Appl. No. 11/524,977 dated Sep. 18, 2009, pp. 1-10.
Office Action for Aldred et al., U.S. Appl. No. 11/524,977 dated Feb. 20, 2009, pp. 1-11.
Office Action for Aldred et al., U.S. Appl. No. 11/524,977 dated Dec. 14, 2009, pp. 1-17.
Office Action for Aldred et al., U.S. Appl. No. 11/525,060 dated Feb. 23, 2009, pp. 1-12.
Interview Summary for Aldred et al., U.S. Appl. No. 11/525,060 dated Jul. 1, 2009, pp. 1-2.
Office Action for Aldred et al., U.S. Appl. No. 11/525,060 dated Feb. 5, 2010, pp. 1-18.
Office Action for Cox et al., U.S. Appl. No. 11/524,675 dated Feb. 18, 2009, pp. 1-13.
Office Action for Cox et al., U.S. Appl. No. 11/524,675 dated Dec. 18, 2009, pp. 1-15.
Office Action for Cox et al., U.S. Appl. No. 11/699,601 dated Jun. 10, 2009, pp. 1-11.
Office Action for Cox et al., U.S. Appl. No. 11/699,601 dated Dec. 28, 2009, pp. 1-14.
Office Action for Cox et al., U.S. Appl. No. 11/699,601 dated May 18, 2010, pp. 1-12.
Office Action for Cox, U.S. Appl. No. 11/699,602 dated Jun. 26, 2009, pp. 1-12.
Office Action for Cox, U.S. Appl. No. 11/699,602 dated Mar. 17, 2010, pp. 1-15.
Kilcast et al., "Sensory perception of creaminess and its relationship with food structure", Food Quality and Preference 13 (2002) 609-623.
McCabe et al., "Secretion of Cryparin, a Fungal Hydrophobin", Applied and Environmental Microbiology, Dec. 1999, vol. 65, No. 12, pp. 5431-5435.
Talbot, "Aerial Morphogenesis: Enetr the Chaplins", Current Biology, vol. 13, R696-R698, Sep. 2003.
Linder et al., "The Hydrophobins HFBI and HFBII from *Trichoderma reesi* Showing Efficient Interactions with Nonionic Surfactants in Aqueous Two-Phase Systems", Biomacromolecules 2001, 2, 511-517.
Kloek et al., "Effect of Bulk and Interfacial Rheological Properties on Bubble Dissolution", Journal of Colloid and Interface Science 237, 158-166 (2001).
Murray et al., "Foam stability: proteins and nanoparticles", Colloid & Interface Science 9 (2004), 314-320.

\* cited by examiner

Air bubbles
Ice crystals

FROZEN AERATED CONFECTION

FIELD OF THE INVENTION

The present invention relates to frozen aerated confections.

BACKGROUND TO THE INVENTION

Frozen aerated confections, for example ice cream, sherbet, sorbet and frozen yoghurt, contain minute ice crystals and air bubbles. The size of the ice crystals and air bubbles affects the texture of the product. During frozen storage, ice crystals and air bubbles coarsen. Coarsening leads to deterioration in the texture. For example, when the ice crystals become very large (~100 μm) they can be individually detected in the mouth and the texture becomes icy and gritty. Similarly large air bubbles result in ice cream having a less creamy texture. The rate of coarsening depends on the temperature: the higher the temperature, the faster the coarsening.

Ice structuring proteins (ISPs), also known as antifreeze proteins (AFPs), have been known for some years, and used in ice cream as a means of reducing ice crystal coarsening, especially following thermal abuse. EP0783254 describes a method for minimizing ice-crystal size in a frozen composition by adding an anti-freeze protein. However, ISPs do not prevent coarsening of the air bubbles during storage. Thus there remains a need for frozen aerated confections which are resistant to coarsening both of the ice crystals and the air bubbles.

SUMMARY OF THE INVENTION

In EP1623631, we have found that a fungal protein termed hydrophobin allows the production of foams with excellent stability with respect to coarsening by disproportionation and coalescence. Hydrophobin is surface active and acts as an aerating agent, while also appearing to confer a highly viscoelastic nature to the surface of the air bubbles.

We have now found that by incorporating hydrophobin into a frozen aerated confection containing ISP, coarsening of both the air bubbles and ice crystals is reduced during storage. Accordingly, the present invention provides a frozen aerated confection comprising an ice structuring protein (ISP) and a hydrophobin.

Preferably the hydrophobin is present in an amount of at least 0.001 wt %, more preferably at least 0.01 wt %.

Preferably the hydrophobin is in a substantially isolated form.

Preferably the hydrophobin is a class II hydrophobin.

Preferably the confection comprises at least 0.0005 wt % ISP, more preferably at least 0.001 wt % ISP.

Preferably the ISP is a fish type III ISP, more preferably the ISP is type III HPLC-12.

Preferably the frozen aerated confection has an overrun of from 25% to 400%.

Preferably the frozen aerated confection contains 3 wt % or less fat. Air bubbles in frozen aerated confections are in part stabilized by fat droplets. Thus in low fat products, the problem of air bubble coarsening can be particularly severe. We have found that incorporating hydrophobin into a low fat frozen aerated confection reduces coarsening of the air bubbles during storage.

Preferably the frozen aerated confection is ice cream, sorbet, sherbet or frozen yoghurt, most preferably ice cream.

DETAILED DESCRIPTION OF THE INVENTION

Figure 1A:
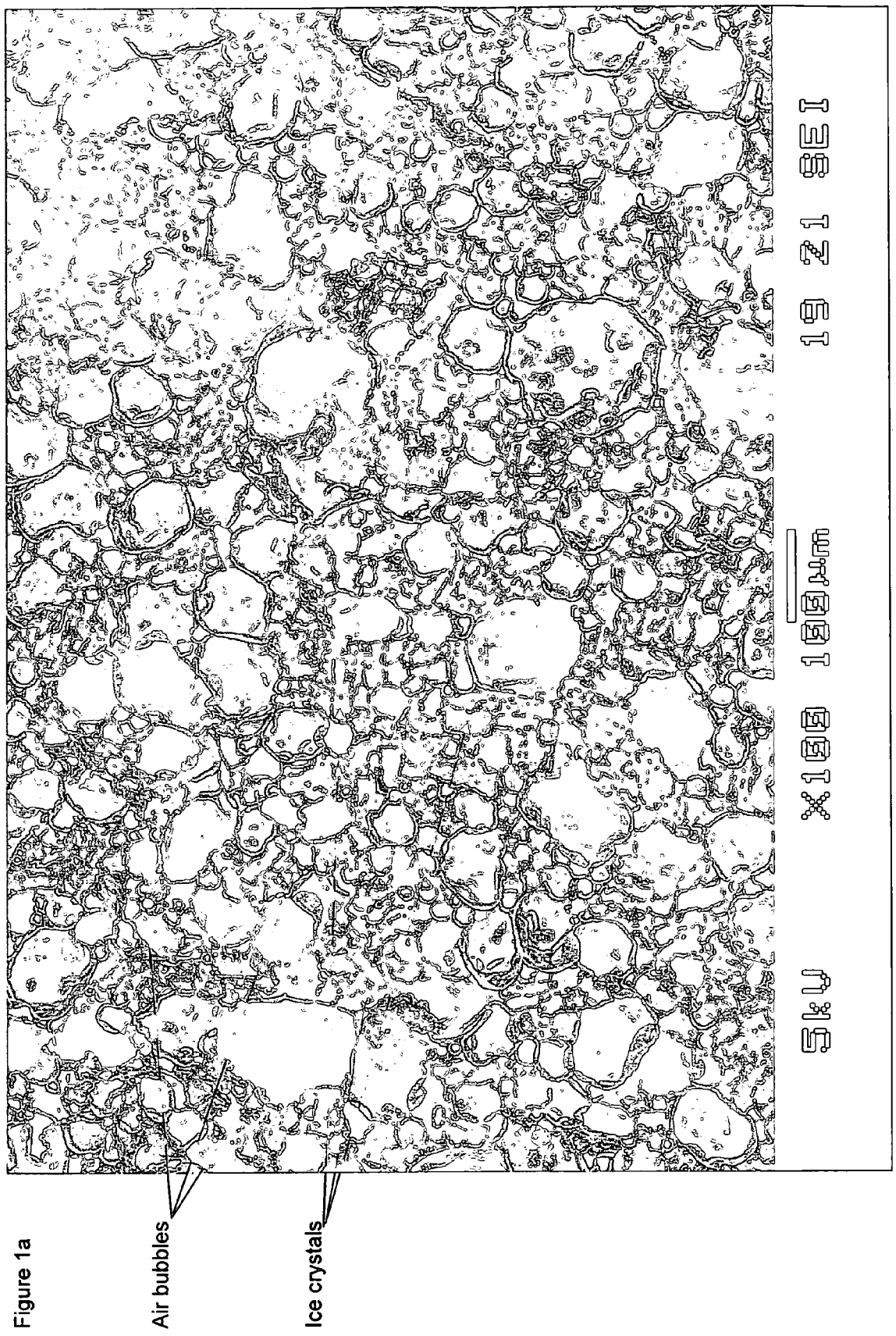
FIG. 1a shows a scanning electron micrograph showing the microstructure of sherbet-type frozen aerated confections containing (a) ISP and hydrophobin.

Unless defined otherwise, all technical and scientific terms used herein have the same meaning as commonly understood by one of ordinary skill in the art (e.g. in frozen confectionery manufacture, chemistry and biotechnology). Definitions and descriptions of various terms and techniques used in frozen confectionery manufacture are found in Ice Cream, 4$^{th}$ Edition, Arbuckle (1986), Van Nostrand Reinhold Company, New York, N.Y. Standard techniques used for molecular and biochemical methods can be found in Sambrook et al., Molecular Cloning: A Laboratory Manual, 3$^{rd}$ ed. (2001) Cold Spring Harbor Laboratory Press, Cold Spring Harbor, N.Y. and Ausubel et al., Short Protocols in Molecular Biology (1999) 4$^{th}$ Ed, John Wiley & Sons, Inc.—and the full version entitled Current Protocols in Molecular Biology. All percentages, unless otherwise stated, refer to the percentage by weight, with the exception of percentages cited in relation to the overrun.

Hydrophobins

Hydrophobins are a well-defined class of proteins (Wessels, 1997, Adv. Microb. Physio. 38: 1-45; Wosten, 2001, Annu Rev. Microbiol. 55: 625-646) capable of self-assembly at a hydrophobic/hydrophilic interface, and having a conserved sequence:

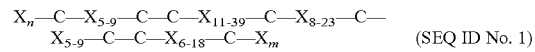

$$X_n\text{—}C\text{—}X_{5\text{-}9}\text{—}C\text{—}C\text{—}X_{11\text{-}39}\text{—}C\text{—}X_{8\text{-}23}\text{—}C\text{—}$$
$$X_{5\text{-}9}\text{—}C\text{—}C\text{—}X_{6\text{-}18}\text{—}C\text{—}X_m \quad \text{(SEQ ID No. 1)}$$

where X represents any amino acid, and n and m independently represent an integer. Typically, a hydrophobin has a length of up to 125 amino acids. The cysteine residues (C) in the conserved sequence are part of disulphide bridges. In the context of the present invention, the term hydrophobin has a wider meaning to include functionally equivalent proteins still displaying the characteristic of self-assembly at a hydrophobic-hydrophilic interface resulting in a protein film, such as proteins comprising the sequence:

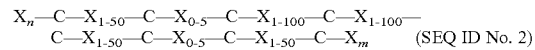

$$X_n\text{—}C\text{—}X_{1\text{-}50}\text{—}C\text{—}X_{0\text{-}5}\text{—}C\text{—}X_{1\text{-}100}\text{—}C\text{—}X_{1\text{-}100}\text{—}$$
$$C\text{—}X_{1\text{-}50}\text{—}C\text{—}X_{0\text{-}5}\text{—}C\text{—}X_{1\text{-}50}\text{—}C\text{—}X_m \quad \text{(SEQ ID No. 2)}$$

or parts thereof still displaying the characteristic of self-assembly at a hydrophobic-hydrophilic interface resulting in a protein film. In accordance with the definition of the present invention, self-assembly can be detected by adsorbing the protein to Teflon and using Circular Dichroism to establish the presence of a secondary structure (in general, α-helix) (De Vocht et al., 1998, Biophys. J. 74: 2059-68).

The formation of a film can be established by incubating a Teflon sheet in the protein solution followed by at least three washes with water or buffer (Wosten et al., 1994, Embo. J. 13: 5848-54). The protein film can be visualised by any suitable method, such as labeling with a fluorescent marker or by the use of fluorescent antibodies, as is well established in the art. m and n typically have values ranging from 0 to 2000, but more usually m and n in total are less than 100 or 200. The definition of hydrophobin in the context of the present invention includes fusion proteins of a hydrophobin and another polypeptide as well as conjugates of hydrophobin and other molecules such as polysaccharides.

Hydrophobins identified to date are generally classed as either class I or class II. Both types have been identified in fungi as secreted proteins that self-assemble at hydrophobilic interfaces into amphipathic films. Assemblages of class I hydrophobins are relatively insoluble whereas those of class II hydrophobins readily dissolve in a variety of solvents.

Hydrophobin-like proteins have also been identified in filamentous bacteria, such as *Actinomycete* and *Streptomyces* sp. (WO01/74864; Talbot, 2003, Curr. Biol, 13: R696-R698). These bacterial proteins by contrast to fungal hydrophobins, form only up to one disulphide bridge since they have only two cysteine residues. Such proteins are an example of functional equivalents to hydrophobins having the consensus sequences shown in SEQ ID Nos. 1 and 2, and are within the scope of the present invention.

The hydrophobins can be obtained by extraction from native sources, such as filamentous fungi, by any suitable process. For example, hydrophobins can be obtained by culturing filamentous fungi that secrete the hydrophobin into the growth medium or by extraction from fungal mycelia with 60% ethanol. It is particularly preferred to isolate hydrophobins from host organisms that naturally secrete hydrophobins. Preferred hosts are hyphomycetes (e.g. *Trichoderma*), basidiomycetes and ascomycetes. Particularly preferred hosts are food grade organisms, such as *Cryphonectria parasitica* which secretes a hydrophobin termed cryparin (MacCabe and Van Alfen, 1999, App. Environ. Microbiol 65: 5431-5435).

Alternatively, hydrophobins can be obtained by the use of recombinant technology. For example host cells, typically micro-organisms, may be modified to express hydrophobins and the hydrophobins can then be isolated and used in accordance with the present invention. Techniques for introducing nucleic acid constructs encoding hydrophobins into host cells are well known in the art. More than 34 genes coding for hydrophobins have been cloned, from over 16 fungal species (see for example WO96/41882 which gives the sequence of hydrophobins identified in *Agaricus bisporus*; and Wosten, 2001, Annu Rev. Microbiol. 55: 625-646). Recombinant technology can also be used to modify hydrophobin sequences or synthesise novel hydrophobins having desired/improved properties.

Typically, an appropriate host cell or organism is transformed by a nucleic acid construct that encodes the desired hydrophobin. The nucleotide sequence coding for the polypeptide can be inserted into a suitable expression vector encoding the necessary elements for transcription and translation and in such a manner that they will be expressed under appropriate conditions (e.g. in proper orientation and correct reading frame and with appropriate targeting and expression sequences). The methods required to construct these expression vectors are well known to those skilled in the art.

A number of expression systems may be used to express the polypeptide coding sequence. These include, but are not limited to, bacteria, fungi (including yeast), insect cell systems, plant cell culture systems and plants all transformed with the appropriate expression vectors. Preferred hosts are those that are considered food grade—'generally regarded as safe' (GRAS).

Suitable fungal species, include yeasts such as (but not limited to) those of the genera *Saccharomyces, Kluyveromyces, Pichia, Hansenula, Candida, Schizo saccharomyces* and the like, and filamentous species such as (but not limited to) those of the genera *Aspergillus, Trichoderma, Mucor, Neurospora, Fusarium* and the like.

The sequences encoding the hydrophobins are preferably at least 80% identical at the amino acid level to a hydrophobin identified in nature, more preferably at least 95% or 100% identical. However, persons skilled in the art may make conservative substitutions or other amino acid changes that do not reduce the biological activity of the hydrophobin. For the purpose of the invention these hydrophobins possessing this high level of identity to a hydrophobin that naturally occurs are also embraced within the term "hydrophobins".

Hydrophobins can be purified from culture media or cellular extracts by, for example, the procedure described in WO01/57076 which involves adsorbing the hydrophobin present in a hydrophobin-containing solution to surface and then contacting the surface with a surfactant, such as Tween 20, to elute the hydrophobin from the surface. See also Collen et al., 2002, Biochim Biophys Acta. 1569: 139-50; Calonje et al., 2002, Can. J. Microbiol. 48: 1030-4; Askolin et al., 2001, Appl Microbiol Biotechnol. 57: 124-30; and De Vries et al., 1999, Eur J Biochem. 262: 377-85.

Ice Structuring Proteins (ISPs)

Ice structuring proteins (ISPs) are proteins that can influence the shape and size of the crystals of ice formed during freezing and also inhibit recrystallisation of ice (Clarke et al., 2002, Cryoletters 23: 89-92; Marshall et al., Ice Cream, 6$^{th}$ Edition, Kluwer Academic/Plenum Publishers, New York, 2003, p 85). Many of these proteins were identified originally in organisms that live in sub-zero environments and are thought to protect the organism from the deleterious effects of the formation of ice crystals in the cells of the organism. For this reason many ice structuring proteins are also known as antifreeze proteins (AFPs). In the context of the present invention, an ISP is defined as a protein that has ice recrystallisation inhibitory (RI) activity.

Ice recrystallisation inhibitory activity properties can conveniently be measured by means of a modified splat assay as described in WO00/53029:

2.5 µl of the solution under investigation in 30% (w/w) sucrose is transferred onto a clean, appropriately labelled, 16 mm circular coverslip. A second coverslip is placed on top of the drop of solution and the sandwich pressed together between finger and thumb. The sandwich is dropped into a bath of hexane held at −80° C. in a box of dry ice. When all sandwiches have been prepared, sandwiches are transferred from the −80° C. hexane bath to the viewing chamber containing hexane held at −6° C. using forceps pre-cooled in the dry ice. Upon transfer to −6° C., sandwiches can be seen to change from a transparent to an opaque appearance. Images are recorded by video camera and grabbed into an image analysis system (LUCIA, Nikon) using a 20× objective. Images of each splat are recorded at time=0 and again after 60 minutes. The size of the ice-crystals in both assays is compared by placing the slides within a temperature controlled cryostat cabinet (Bright Instrument Co Ltd, Huntington, UK). Images of the samples are transferred to a Quantimet 520 MC image analysis system (Leica, Cambridge UK) by means of a Sony monochrome CCD video camera.

Ice crystal sizing can be performed by hand-drawing around the ice-crystals. Typically, at least 100 to 400 crystals are sized for each sample. The ice crystal size is taken as being the longest dimension of the 2D projection of each crystal. The average crystal size is determined as the number average of the individual crystal sizes. The size of the ice-crystals in both assays is compared. If the size at 30-60 minutes is similar or only moderately (less than 10%) increased compared to the size at t=0, and/or the crystal size is less than 20 micrometer, preferably from 5 to 15 micrometer this is an indication of good ice-crystal recrystallisation properties.

Significant ice recrystallisation inhibitory activity can be defined as where a 0.01 wt % solution of the ISP in 30 wt % sucrose, cooled rapidly (at least Δ50° C. per minute) to −40° C., heated rapidly (at least Δ50° C. per minute) to −6° C. and then held at this temperature results in an increase in average ice crystal size over one hour of less than 5 μm.

Types of ISPs

ISPs for use according to the present invention can be derived from any source provided they are suitable for inclusion in food products. ISPs have been identified to date in fish, plants, lichen, fungi, micro-organisms and insects. In addition, a number of synthetic ISPs have been described.

Examples of fish ISP materials are AFGP (for example obtainable from Atlantic cod, Greenland cod and Tomcod), Type I ISP (for example obtainable from Winter flounder, Yellowtail flounder, Shorthorn sculpin and Grubby sculpin), Type II ISP (for example obtainable from Sea raven, Smelt and Atlantic herring) and Type III ISP (for example obtainable from Ocean pout, Atlantic wolffish, Radiated shanny, Rock gunnel and Laval's eelpout).

Type III ISPs are particularly preferred. Type III ISPs typically have a molecular weight of from about 6.5 to about 14 kDa, a beta sandwich secondary structure and a globular tertiary structure. A number of genes encoding type III ISPs have been cloned (Davies and Hew, 1990, FASEB J. 4: 2460-2468). A particularly preferred type III ISP is type III HPLC-12 (Accession No. P19614 in the Swiss-Prot protein database).

Lichen AFPs are described in WO99/37673 and WO01/83534.

Examples of plants in which ISPs have been obtained are described in WO98/04699 and WO98/4148 and include garlic-mustard, blue wood aster, spring oat, winter cress, winter canola, Brussels sprout, carrot (GenBank Accession No. CAB69453), Dutchman's breeches, spurge, daylily, winter barley, Virginia waterleaf, narrow-leaved plantain, plantain, speargrass, Kentucky bluegrass, Eastern cottonwood, white oak, winter rye (Sidebottom et al., 2000, Nature 406: 256), bittersweet nightshade, potato, chickweed, dandelion, spring and winter wheat, triticale, periwinkle, violet and grass.

The ISPs can be obtained by extraction from native sources by any suitable process, for example the isolation processes as described in WO98/04699 and WO98/4148.

Alternatively, ISPs can be obtained by the use of recombinant technology. For example host cells, typically micro-organisms or plant cells, may be modified to express ISPs and the ISPs may then be isolated and used in accordance with the present invention. Techniques for introducing nucleic acid constructs encoding ISPs into host cells are well known in the art.

Typically, an appropriate host cell or organism would be transformed by a nucleic acid construct that encodes the desired ISP. The nucleotide sequence coding for the polypeptide can be inserted into a suitable expression vector encoding the necessary elements for transcription and translation and in such a manner that they will be expressed under appropriate conditions (e.g. in proper orientation and correct reading frame and with appropriate targeting and expression sequences). The methods required to construct these expression vectors are well known to those skilled in the art.

A number of expression systems may be used to express the polypeptide coding sequence. These include, but are not limited to, bacteria, fungi (including yeast), insect cell systems, plant cell culture systems and plants all transformed with the appropriate expression vectors. Preferred hosts are those that are considered food grade—'generally regarded as safe' (GRAS).

Suitable fungal species include yeasts such as (but not limited to) those of the genera *Saccharomyces, Kluyveromyces, Pichia, Hansenula, Candida, Schizo saccharomyces* and the like, and filamentous fungal species such as (but not limited to) those of the genera *Aspergillus, Trichoderma, Mucor, Neurospora, Fusarium* and the like. Preferably the species selected is a yeast, most preferably a species of *Saccharomyces* such as *S. cerevisiae*. Where glycosylation of the ISP leads to reduced activity then it is preferred that the host exhibits reduced glycosylation of heterologous proteins.

A wide variety of plants and plant cell systems can also be transformed with the nucleic acid constructs of the desired polypeptides. Examples of plant species include maize, tomato, tobacco, carrots, strawberries, rape seed and sugar beet.

The sequences encoding the ISPs are preferably at least 80% identical at the amino acid level to an ISP identified in nature, more preferably at least 95% or 100% identical. However, persons skilled in the art may make conservative substitutions or other amino acid changes that do not reduce the RI activity of the ISP. For the purpose of the invention these ISPs possessing this high level of identity to an ISP that naturally occurs are also embraced within the term "ISPs".

Aeration

The term "aerated" means that gas has been intentionally incorporated into the mixture to form a foam, for example by mechanical means. The gas can be any gas, but is preferably, particularly in the context of food products, a food-grade gas such as air, nitrogen or carbon dioxide. The extent of aeration is typically defined in terms of "overrun". In the context of the present invention, % overrun is defined in terms of the volume of the aerated product and the volume of the unaerated mix from which it was formed:

$$\text{Overrun} = \frac{\text{Volume of final aerated product} - \text{volume of unaerated mixture}}{\text{Volume of unaerated mixture}} \times 100$$

Overrun is measured at atmospheric pressure. The amount of overrun present in the product will vary depending on the desired product characteristics. Preferably the level of overrun is at least 10%, more preferably at least 25 or 50%. Preferably the level of overrun is less than 400%, more preferably less than 300 or 200%.

Frozen Aerated Confections

The amount of hydrophobin present in the frozen aerated confection will generally vary depending on the confection formulation and volume of the air phase. Typically, the confection will contain at least 0.001 wt %, hydrophobin, more preferably at least 0.005 or 0.01 wt %. Typically the confection will contain less than 1 wt % hydrophobin. The hydrophobin can be from a single source or a plurality of sources e.g. the hydrophobin can be a mixture of two or more different hydrophobin polypeptides.

The hydrophobin is added in a form and in an amount such that it is available to stabilise the air phase. By the term "added", we mean that the hydrophobin is deliberately introduced into the confection for the purpose of taking advantage of its foam stabilising properties. Consequently, where ingredients are present or added that contain fungal contaminants, which may contain hydrophobin polypeptides, this does not constitute adding hydrophobin within the context of the present invention.

Typically, the hydrophobin is added to the confection in a form such that it is capable of self-assembly at an air-liquid surface.

Typically, the hydrophobin is added to the confections of the invention in an isolated form, typically at least partially purified, such as at least 10% pure, based on weight of solids. By "added in isolated form", we mean that the hydrophobin is not added as part of a naturally-occurring organism, such as a mushroom, which naturally expresses hydrophobins. Instead, the hydrophobin will typically either have been extracted from a naturally-occurring source or obtained by recombinant expression in a host organism.

In one embodiment, the hydrophobin is added to the confection in monomeric, dimeric and/or oligomeric (i.e. consisting of 10 monomeric units or fewer) form. Preferably at least 50 wt % of the added hydrophobin is in at least one of these forms, more preferably at least 75, 80, 85 or 90 wt %. Once added, the hydrophobin will typically undergo assembly at the air/liquid interface and therefore the amount of monomer, dimer and oligomer would be expected to decrease.

Frozen aerated confections of the invention comprise ISP, typically at least about 0.0001 wt % ISP, more preferably at least 0.0005 wt %, most preferably at least 0.001 wt %. ISPs can be used at very low concentrations and therefore preferably the confections comprise less than 0.05 wt % ISP. A preferred range is from about 0.001 to 0.01 wt %. ISPs can be used individually or in combination.

Frozen aerated confections may optionally contain other ingredients such as one or more of the following: other proteins such as dairy proteins, either as pure ingredients or as liquid ingredients, e.g. milk or cream; oil or fat, notably in the form of an emulsified phase; sugars; salts; colours and flavours; chemical emulsifiers, such as monoglycerides; fruit or vegetable purees/extracts/juice; stabilisers or thickeners, such as polysaccharides; preservatives.

Frozen aerated products may optionally comprise coatings, such as a layer of chocolate or couverture and/or inclusions, such as nuts, fruit, toffee or chocolate pieces. In this case, the fat content of the frozen aerated confection does not include fat present in the coating or inclusion.

In one embodiment, the frozen aerated confection contains 3 wt % or less fat, preferably 2 wt % or less, more preferably 1 wt % or less. In a preferred embodiment, the confection is fat-free, which means that the confection contains substantially no fat (i.e. less than 0.1 wt %).

EXAMPLES

The present invention will now be described further with reference to the following figures and examples which are illustrative only and non-limiting, wherein:

FIG. 1a shows a scanning electron micrograph showing the microstructure of sherbet-type frozen aerated confections containing (a) ISP and hydrophobin.

Figure 1B:
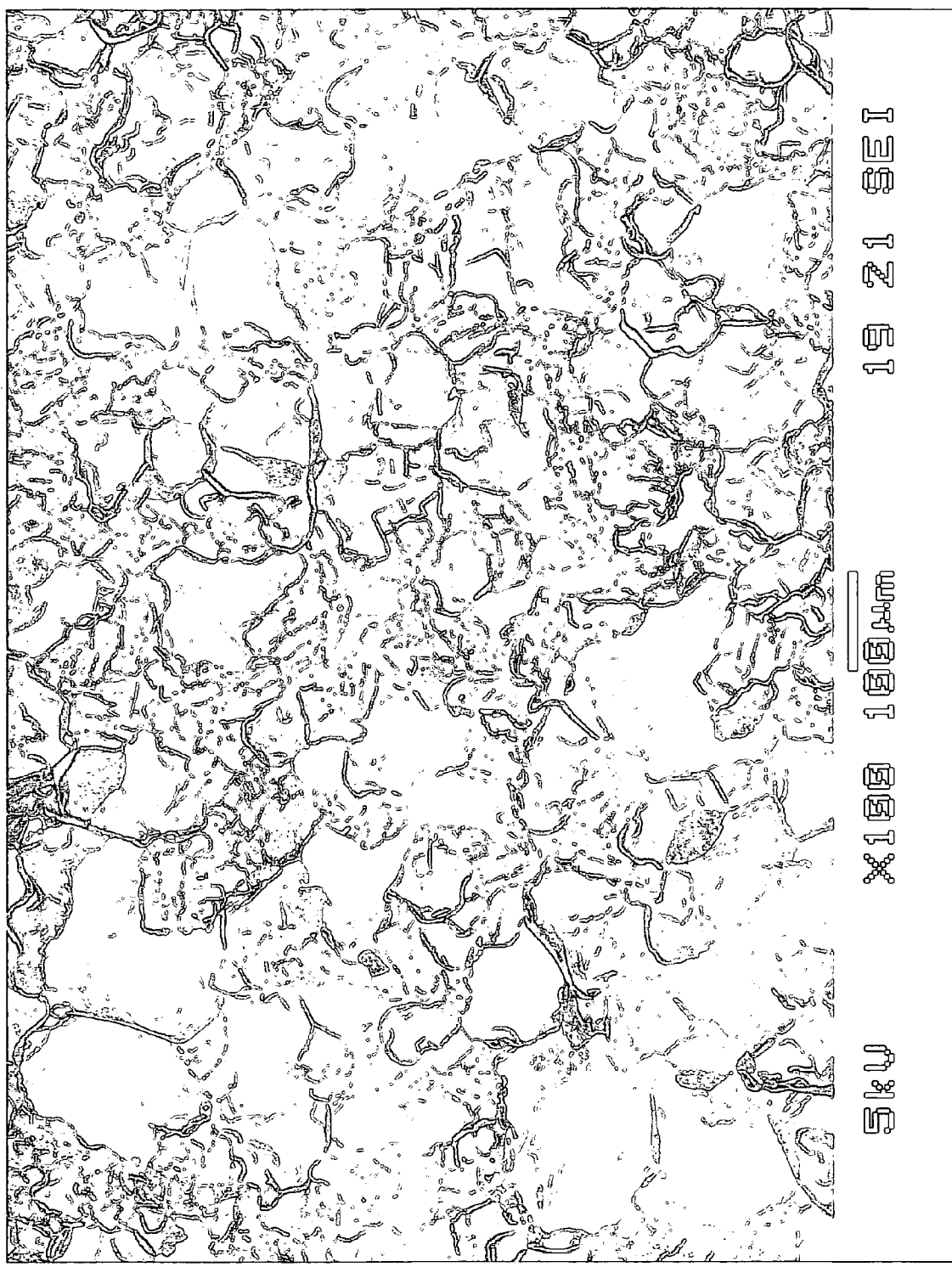
FIG. 1b shows a scanning electron micrograph showing the microstructure of sherbet-type frozen aerated confections containing (b) ISP but not hydrophobin.

FIG. 1b shows a scanning electron micrograph showing the microstructure of sherbet-type frozen aerated confections containing (b) ISP but not hydrophobin.

Figure 2A:
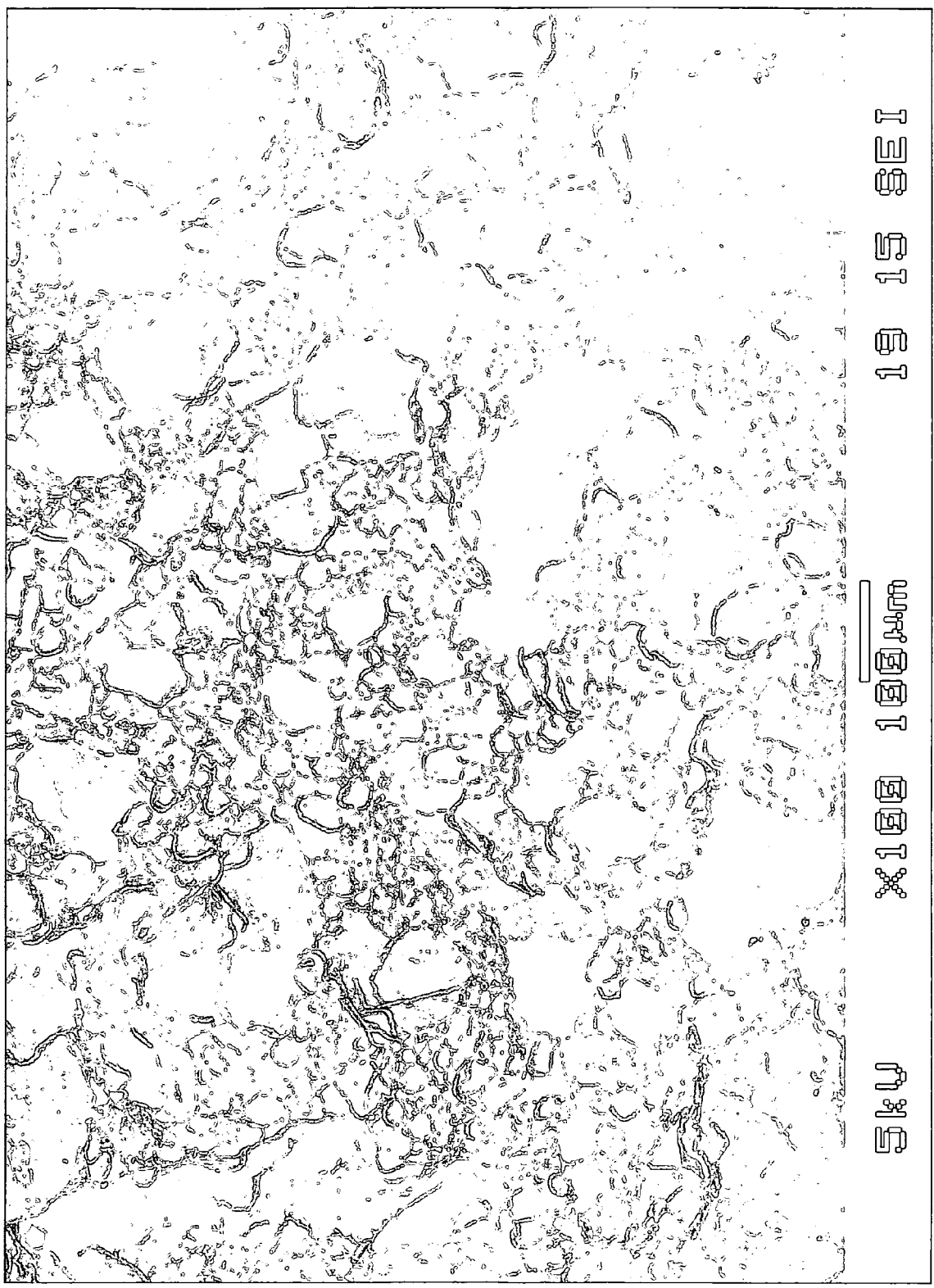
FIG. 2a shows a scanning electron micrograph showing the microstructure of ice cream-type frozen aerated confections containing (a) ISP and hydrophobin.

FIG. 2a shows a scanning electron micrograph showing the microstructure of ice cream-type frozen aerated confections containing (a) ISP and hydrophobin.

Figure 2B:
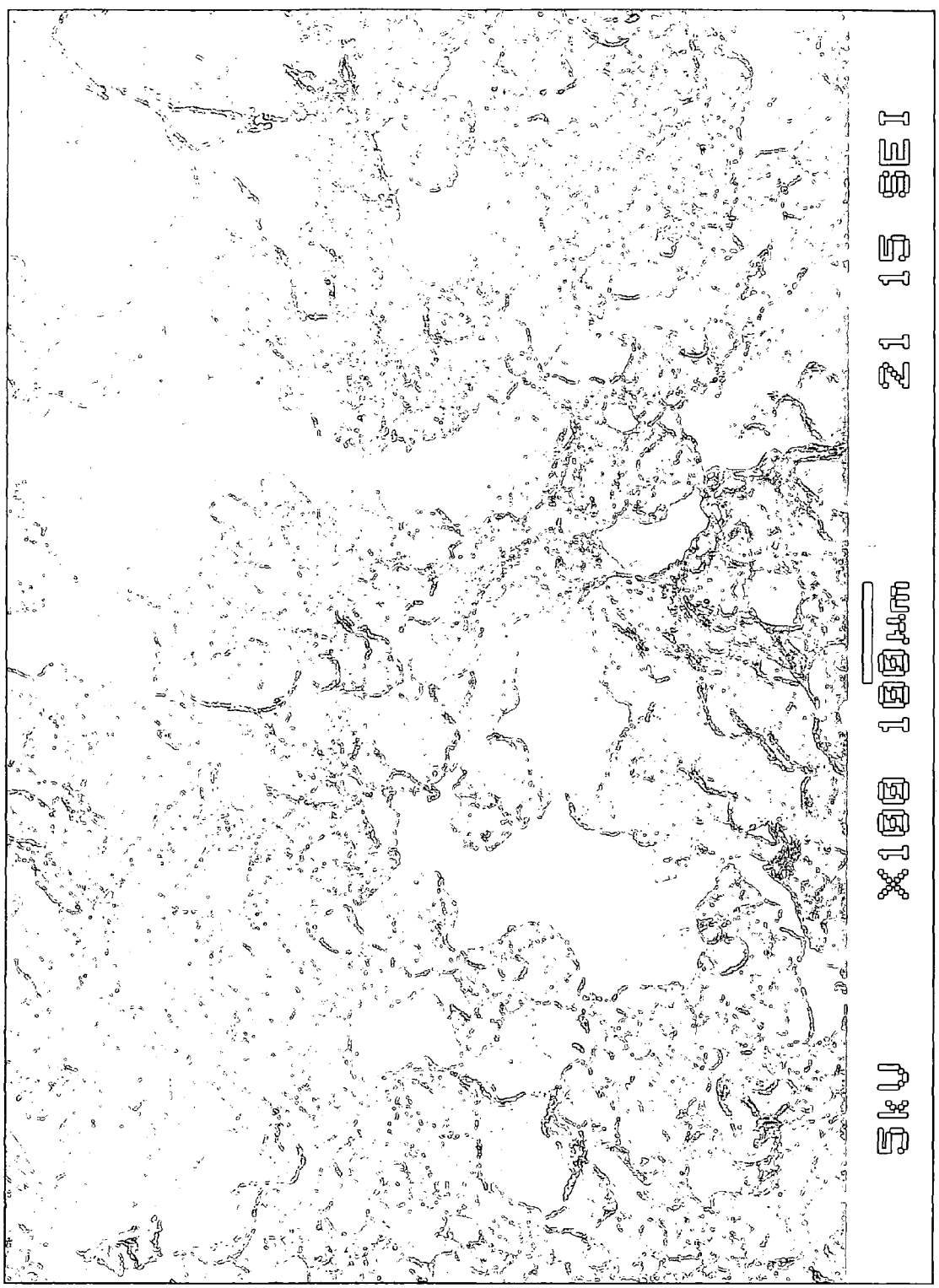
FIG. 2b shows a scanning electron micrograph showing the microstructure of ice cream-type frozen aerated confections containing (b) ISP but not hydrophobin.

FIG. 2b shows a scanning electron micrograph showing the microstructure of ice cream-type frozen aerated confections containing (b) ISP but not hydrophobin.

Two different types of frozen aerated confection were prepared containing ice structuring protein ISP III and hydrophobin HFBII: a sherbet-type formulation which contains no fat (example 1) and an ice cream formulation (example 2). Corresponding comparative examples A (sherbet) and B (ice cream) which did not contain hydrophobin were also prepared. The formulations are given in Table 1.

TABLE 1

Mix Formulations

| | Concentration (wt %) | | | |
|---|---|---|---|---|
| Ingredient | Example 1 | Comparative Example A | Example 2 | Comparative Example B |
| Sucrose | 22 | 22 | 20.9 | 20.9 |
| Xanthan gum | 0.2 | 0.2 | 0.2 | 0.2 |
| SMP | 5.0 | 5.0 | 4.75 | 4.75 |
| Coconut oil | 0 | 0 | 5 | 5 |
| Emulsifier HP60 | 0 | 0 | 0.15 | 0.15 |
| ISP III | 0.004 | 0.004 | 0.004 | 0.004 |
| HFB II | 0.10 | 0 | 0.10 | 0 |
| Water | to 100 | to 100 | to 100 | to 100 |

SMP (skimmed milk powder) contained 33-36% protein, 0.8% fat, 3.7% moisture and was obtained from United Milk, UK. Xanthan gum (Keltrol RD cold dispersible) was obtained from CP Kelco. HP60 (saturated mono-diglyceride containing 60% monoglyceride) was obtained from Danisco. The ice structuring protein, ISP III, was recombinant ocean pout type III HPLC-12 produced in yeast essentially as described in WO97/02343. The hydrophobin HFBII had been purified from *Trichoderma reesei* essentially as described in WO00/58342 and Linder et al., 2001, Biomacromolecules 2: 511-517. It was obtained from VTT Biotechnology, Finland.

Mix Preparation

The mixes were prepared in 160 g batches. The sucrose, xanthan gum, skimmed milk powder and emulsifier (where used) were dry blended and added slowly into stirred water at room temperature. The mixes were heated to 55° C. and stirred for around 30 minutes to ensure that xanthan and milk proteins were fully hydrated.

The sherbet-type mixes (example 1 and comparative example A) were cooled to room temperature. The ISP was added as an aliquot of a 13.6 mg/ml solution to obtain the required final concentration. The solutions were subsequently stirred for a further period before being placed in a domestic refrigerator overnight to bring the temperature to 5° C. HFBII (where used) was added to the mix as an aliquot of a 5 mg/ml solution to give the required final concentration. The solutions were then stirred gently for a further short period.

The ice cream mixes (example 2 and comparative example B) were cooled to 40° C. Molten coconut oil was added and the mix was immediately sonicated (Branson Sonifer with 6.4 mm tapered tip) for 4 minutes at 70% amplitude with the tip well immersed in the solution. The solution was then cooled rapidly to 5° C. in order to crystallise the fat droplets. The ISP was added as an aliquot of a 13.6 mg/ml solution to obtain the required final concentration. HFBII (where used) was added to the mix as an aliquot of a 5 mg/ml solution to give the required final concentration. The solution was then stirred gently for a further short period.

Preparation of Frozen Aerated Confections

A batch ice cream freezer (scraped surface heat exchanger) was used to prepare ice cream samples from the mixes. The freezer consisted of a horizontal, jacketed cylindrical barrel (diameter 72 mm, length 119 mm, working volume 145 ml) which was cooled with a silicon oil refrigerant. The cold inner surface of the barrel was scraped by two stainless steel scraper blades (length 97 mm, width 14 mm and thickness 1.5 mm) mounted on a shaft (diameter 63 mm) which rotated about the axis of the barrel. The blades were evenly spaced around the circumference of the shaft and were freely hinged. The freezer housed an inlet/outlet valve of 4.8 mm bore, a vent valve and a temperature probe, to monitor product temperature during freezing.

121 ml of each mix was injected into the barrel. This volume is chosen so that the final ice cream has an overrun of 100%. The barrel was then pressurised to 5 bar using filtered, compressed air. The mix was frozen using a refrigerant temperature of −40° C. and a shaft speed of 1000 rpm for 3 minutes; the refrigerant temperature was then increased to −15° C.; after one minute the shaft speed was reduced to 400 rpm for a further 3 minutes. The ice cream was then withdrawn from the freezer by opening the outlet valve, filled into 20 ml containers and immediately hardened in a blast freezer at −35° C. for 2 hours.

Storage

Samples were then stored for 1 week at −10° C. At this temperature the microstructure of standard ice cream deteriorates due to coarsening of the ice crystals and air bubbles. After 1 week of storage, the samples were held at −80° C. (a temperature at which ice cream maintains microstructural quality) until analysed.

Scanning Electron Microscopy

The microstructure of each sample was visualised using low temperature Scanning Electron Microscopy (SEM). To prepare specimens for microscopy, the sample was held at −80° C. on dry ice and a section was cut. This section, approximately 5 mm×5 mm×10 mm in size, was mounted on a sample holder using a Tissue Tek: OCT™ compound (PVA 11%, Carbowax 5% and 85% non-reactive components). The sample including the holder was plunged into liquid nitrogen slush and transferred to a low temperature preparation chamber (Oxford Instruments CT1500HF) held under vacuum, approximately $10^{-4}$ bar. The sample was warmed up to −90° C. for approximately 60 to 90 seconds so that ice slowly sublimed to reveal surface details, and then cooled to −110° C. ending the sublimation. The sample was then coated with gold using argon plasma. This process also took place under vacuum with an applied pressure of $10^{-1}$ millibars and current of 6 milliamps for 45 seconds. The sample was then transferred to a conventional Scanning Electron Microscope (JSM 5600), fitted with an Oxford Instruments cold stage at a temperature of −160° C. The sample was imaged and areas of interest were captured via digital image acquisition software.

Results

FIG. 1 compares scanning electron micrographs of the microstructure of (a) example 1 (containing ISP and hydrophobin) and (b) comparative example A (containing ISP but not hydrophobin). The ice crystals appear as grey irregular shaped objects, often with angular corners or flat sides. The air bubbles are somewhat larger and darker, and generally appear as holes.

There is little difference in the ice crystal structure between the two samples because in each case the ISP is effective at preventing coarsening so that the ice crystals remain small (typically <50 µm in size). In FIG. 1(a), there are a large number of small air bubbles (again typically <50 µm in size) which have a generally round shape. However, in FIG. 1(b) the air bubbles are significantly larger and fewer in number, i.e. they have coarsened. FIG. 1(b) also shows some bubbles that have coalesced to form large, irregular-shaped voids.

FIG. 2 compares scanning electron micrographs of the microstructure of (a) example 2 (containing ISP and hydrophobin) and (b) comparative example B (containing ISP but not hydrophobin) after storage at −10° C. Again there is little difference in the ice crystal structure between the two samples because the ISP is effective at preventing coarsening of the ice crystals. However, FIG. 2(a) shows many small air bubbles (less than 50 µm in size) whereas in FIG. 2(b) there are fewer small air bubbles and more large ones. Some small air bubbles are still visible, probably because of the presence of fat, which helps to stabilize the air bubbles. FIG. 2(b) also shows large, irregular-shaped voids.

Examples 1 and 2 show that in frozen aerated confections which contain both ISP and hydrophobin, both the ice crystals and the air bubbles are resistant to coarsening, so that the desired textural qualities of smoothness and creaminess are retained.

The various features and embodiments of the present invention, referred to in individual sections above apply, as appropriate, to other sections, *mutatis mutandis*. Consequently features specified in one section may be combined with features specified in other sections, as appropriate.

All publications mentioned in the above specification are herein incorporated by reference. Various modifications and variations of the described products of the invention will be apparent to those skilled in the art without departing from the scope of the invention. Although the invention has been described in connection with specific preferred embodiments, it should be understood that the invention as claimed should not be unduly limited to such specific embodiments. Indeed, various modifications of the described modes for carrying out the invention which are apparent to those skilled in the relevant fields are intended to be within the scope of the following claims.

The invention claimed is:

1. A frozen aerated confection comprising an ice structuring protein (ISP) and at least 0.001 wt % of a class II hydrophobin wherein the hydrophobin is added in isolated form or obtained by use of recombinant technology, said confection having an overrun of from 25% to 400% and 3 wt % or less fat, said hydrophobin being at least 10% pure and wherein air bubbles with diameters of less than 50 um are greater in concentration than in the same frozen aerated confection prepared with the same process except without the isolated or recombinant formed class II hydrophobia when measured after storage for 1 week at −10 C.

2. The confection according to claim 1 which comprises at least 0.0005 wt % ISP.

3. The confection according to claim 1 wherein the ISP is a fish type III ISP.

4. The confection according to claim 3 wherein the ISP is type III HPLC-12.

5. The confection according to claim 1 which is an ice cream.

6. The confection according to claim 1 comprising 1 wt % or less fat.

7. The confection according to claim 6 comprising less than 0.1 wt % fat.

8. The confection according to claim 1 comprising fat wherein the fat is coconut oil.

9. The confection according to claim 6 comprising at least 0.0005% ice structuring protein.

10. The confection according to claim 9 having at least 50% up to 400% overrun.

11. The confection according to claim 9 prepared by freezing a mix in a scraped surface heat exchanger.

* * * * *

UNITED STATES PATENT AND TRADEMARK OFFICE
CERTIFICATE OF CORRECTION

PATENT NO. : 8,178,151 B2
APPLICATION NO. : 11/639851
DATED : May 15, 2012
INVENTOR(S) : Allan Sidney Bramley et al.

It is certified that error appears in the above-identified patent and that said Letters Patent is hereby corrected as shown below:

IN THE CLAIMS:

In Claim 1, column 10, line 43: "hydrophobia" should read "hydrophobin"

Signed and Sealed this
Seventeenth Day of July, 2012

David J. Kappos
*Director of the United States Patent and Trademark Office*